US009055351B2

(12) United States Patent  (10) Patent No.: US 9,055,351 B2
Kim  (45) Date of Patent: Jun. 9, 2015

(54) METHOD FOR PROCESSING INFORMATION IN CONTENT RECEIVER

(75) Inventor: Minho Kim, Seoul (KR)

(73) Assignee: HUMAX CO., LTD., Seongnam-Si, Gyeonggi-Do (KR)

( * ) Notice: Subject to any disclaimer, the term of this patent is extended or adjusted under 35 U.S.C. 154(b) by 15 days.

(21) Appl. No.: 13/546,853

(22) Filed: Jul. 11, 2012

(65) Prior Publication Data

US 2013/0100354 A1  Apr. 25, 2013

(30) Foreign Application Priority Data

Oct. 24, 2011 (KR) .................... 10-2011-0108818

(51) Int. Cl.
H04H 60/33 (2008.01)
H04N 21/81 (2011.01)
H04N 21/235 (2011.01)
H04N 21/4385 (2011.01)

(52) U.S. Cl.
CPC ......... *H04N 21/8146* (2013.01); *H04N 21/235* (2013.01); *H04N 21/43853* (2013.01)

(58) Field of Classification Search
None
See application file for complete search history.

(56) References Cited

U.S. PATENT DOCUMENTS

| 2003/0172376 | A1* | 9/2003 | Coffin, III | 725/22 |
| 2004/0031046 | A1* | 2/2004 | Weinblatt et al. | 725/23 |
| 2007/0016936 | A1 | 1/2007 | Okada et al. | |
| 2007/0138286 | A1* | 6/2007 | Kamijoh et al. | 235/462.04 |
| 2008/0092154 | A1 | 4/2008 | Hogyoku | |
| 2009/0031373 | A1* | 1/2009 | Hogyoku | 725/104 |
| 2011/0106597 | A1* | 5/2011 | Ferdman et al. | 705/14.11 |
| 2012/0138671 | A1* | 6/2012 | Gaede et al. | 235/375 |
| 2012/0145779 | A1* | 6/2012 | Bietenbeck et al. | 235/375 |

FOREIGN PATENT DOCUMENTS

| EP | 1724695 A1 | 11/2006 |
| JP | 2006-246056 A | 9/2006 |

OTHER PUBLICATIONS

Murray et al., "Bitmap Flies," Chapter 3, Encyclopedia of Graphics File Formats, Bitmap Files, Jan. 1, 1996, pp. 55-75 and 101-107(30 pages), XP002515669.

* cited by examiner

*Primary Examiner* — Nasser Goodarzi
*Assistant Examiner* — Adil Ocak
(74) *Attorney, Agent, or Firm* — Birch, Stewart, Kolasch & Birch, LLP (57) ABSTRACT

The present invention relates to a method of processing information by a content receiver. According to an embodiment, the method includes detecting multi-dimensional code data split and inserted into a content provided through broadcast or an IP when the content is played, temporarily storing the detected multi-dimensional code data, synthesizing the temporarily stored multi-dimensional code data into a multi-dimensional code, when the play of the content is terminated, outputting the synthesized multi-dimensional code image on a screen or making a connection to a server corresponding to a URL obtained by decoding the synthesized multi-dimensional code image or generating and displaying a new multi-dimensional code based on the multi-dimensional code image. The identifier of the broadcast receiver or user's identifier is transmitted to the connected server so that a viewer may be compensated for watching the content.

18 Claims, 5 Drawing Sheets
(1 of 5 Drawing Sheet(s) Filed in Color)

1. Version Information
2. Format Information
3. Data and Error Correction Keys
4. Required Patterns:
    4.1. Position
    4.2. Alignment
    4.3. Timing

METHOD FOR PROCESSING INFORMATION IN CONTENT RECEIVER

CROSS-REFERENCE TO RELATED APPLICATION

This application claims priority to Korean Patent Application No. 10-2011-0108818 filed on Oct. 24, 2011, the contents of which are herein incorporated by reference in its entirety.

BACKGROUND OF THE INVENTION

1. Technical Field

Embodiments of the present invention are directed toward methods of processing information by a content receiver, and more specifically to processing multi-dimensional code data distributedly transmitted over broadcast signals.

2. Discussion of the Related Art

As various types of digital broadcast, such as terrestrial, satellite, and cable, is in service for more channels and contents, set-top boxes, TVs, or other broadcast receivers are proliferating to receive the digital broadcast.

PVR (Personal Video Recording)-supported set-top boxes allow viewers to record broadcast programs in a high-volume storage medium so that they can view the recorded programs at desired times, and PIP (Picture In Picture)-supported set-top boxes enable contents stored in a number of channels or storage media to be played back at the same time.

Such receivers may also allow users to view two or more programs from different broadcast channels or one from a broadcast channel and the others from the storage medium at the same time through the split screen or to view a program from a broadcast channel while recording other programs in the storage medium.

Due to increased broadcast channels and stored contents in the storage medium, users tend to do frequent channel switching, and it is thus difficult to judge whether they got through with a particular broadcast program or in what kind of pattern they watch the broadcast programs. There is a need for a method of compensating viewers who have watched a whole broadcast program.

SUMMARY

Embodiments of the present invention provide a method of compensating users who have watched a whole broadcast program and a method of effectively identifying whether users have watched a whole broadcast program.

According to an embodiment, there is provided a method of processing information by a content receiver, the method including detecting multi-dimensional code data split and inserted into a content provided through broadcast or an IP when the content is reproduced, temporarily storing the detected multi-dimensional code data, and synthesizing the temporarily stored multi-dimensional code data into a multi-dimensional code.

In an embodiment, the method may further include outputting the synthesized multi-dimensional code when the reproduction of the content is completed.

In an embodiment, synthesizing may be performed after predetermined data constituting the multi-dimensional code is detected and stored by a predetermined reference or more or after the reproduction of the content is terminated.

In an embodiment, link information for connecting to a server may be encoded in the multi-dimensional code.

In an embodiment, one or more of identification information indicating the content and transmission time of the content may be further encoded in the multi-dimensional code.

In an embodiment, the method may further include making a connection to a server corresponding to a URL obtained by decoding the synthesized multi-dimensional code when the reproduction of the content is terminated and transmitting an identifier of the receiver reproducing the content to the server.

In an embodiment, the multi-dimensional code data may include splitting information associated with splitting of the multi-dimensional code and data for each of pieces generated when the multi-dimensional code is split.

In an embodiment, the step of transmitting may further transmit the synthesized multi-dimensional code to the server.

In an embodiment, the step of transmitting may further transmit reproducing start time and reproducing end time for the content, or the reproducing start time or the reproducing end time and reproducing duration time to the server.

In an embodiment, the splitting information may include size information of the multi-dimensional code and information on the number of the split pieces.

In an embodiment, the splitting information may further include information indicating a method of scanning bitmap data in the piece.

In an embodiment, in the splitting information may be included in a first section and one or more sections of the content.

In an embodiment, the data for the piece may include positional information indicating where a corresponding piece is placed in the multi-dimensional code and a bit stream for the bitmap data of the piece.

In an embodiment, the positional information mya be a coordinate of a point in a region occupied by the corresponding piece or a number assigned to the corresponding piece, and wherein the data for the piece may further include the number of cells of the bitmap of the corresponding piece.

In an embodiment, the content may be split in sections of the number of the split pieces, and the data for each piece may be inserted in a section randomly selected among sections constituting the content and recorded once or more in the selected section.

In an embodiment, the length of the section where the data for each piece may be inserted varies in proportion to the size of the corresponding piece.

In an embodiment, the multi-dimensional code may be split into a plurality of same sized pieces, and the section where the data for one piece is inserted may be same as the section for another piece in their lengths.

In an embodiment, a region including main information necessary for decoding the multi-dimensional code image may be split into one or two pieces and repeatedly inserted into one or more of sections constituting the content.

In an embodiment, the method may further include generating a new multi-dimensional code based on the multi-dimensional code and displaying the new multi-dimensional code.

In an embodiment, the new multi-dimensional code may include a URL decoded from the multi-dimensional code and identification information of the receiver reproducing the content or user identification information.

In an embodiment, the new multi-dimensional code may further include reproducing start time and reproducing end time for the content, or the reproducing start time or the reproducing end time and reproducing duration time.

In an embodiment, the identification information of the receiver or the user identification information may be in an encrypted manner inserted into the new multi-dimensional code.

In an embodiment, the identification information of the receiver or the user identification information may be encrypted based on one or more of multi-dimensional code data inserted in the content.

In an embodiment, the identification information of the receiver or the user identification information may be encrypted using, as a seed for encryption, at least one of the size of the multi-dimensional code and the number of the split pieces.

In an embodiment, information, other than URL, to be included in the multi-dimensional code may be represented in a form of a parameter of the URL.

According to another embodiment, there is provided a content receiver including a receiving unit for receiving a content through broadcast or an IP, a playing unit for decoding data output from the receiving unit, a multi-dimensional code processing unit for detecting and temporarily storing multi-dimensional code data split and inserted into the content from data decoded by the playing unit and synthesizing the multi-dimensional code data into a multi-dimensional code, and a controller for controlling each element.

In an embodiment, the multi-dimensional code processing unit may include a data detector for detecting the multi-dimensional code data from the content, a code synthesizer for synthesizing the multi-dimensional code data into the multi-dimensional code, and a code decoder for decoding the synthesized multi-dimensional code.

In an embodiment, the multi-dimensional code processing unit may further include a code encoder for generating a new multi-dimensional code based on the multi-dimensional code.

Accordingly, the embodiments of the present invention allow viewers to be more engrossed in viewing broadcast programs so that they can watch ads, drams, or movies from beginning to end, allow viewers who have watched a whole broadcast program to be compensated for their watching, and allow broadcasting stations to be fed back after watching and to obtain additional effects of a higher audience rating together with a high watching rate for ads.

BRIEF DESCRIPTION OF THE DRAWINGS

The patent or application file contains at least one color drawing. Copies of this patent or patent application publication with color drawing will be provided by the USPTO upon request and payment of the necessary fee.

The embodiments of the present invention will become readily apparent by reference to the following detailed description when considered in conjunction with the accompanying drawings wherein.

DESCRIPTION OF THE EMBODIMENTS

Hereinafter, embodiments of the present invention will be described in greater detail with reference to the accompanying drawings.

Figure 1:
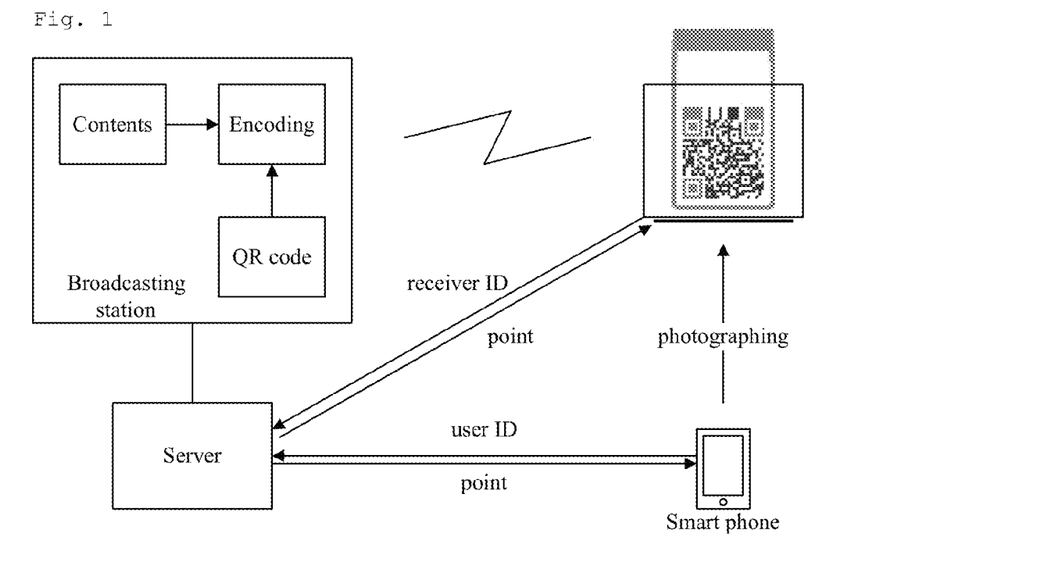
FIG. 1 illustrates a concept of compensating for watching a broadcast program through a QR code according to an embodiment of the present invention.

A two-dimensional (2D) code, such as a QR (Quick Response) code, is used as medium information to compensate viewers who have watched a whole broadcast program (or content), such as a drama or ads. The image of the QR code is split, and distributedly provided at the airtime of its corresponding broadcast program. A broadcast receiver extracts data from the broadcast program signal and synthesizes the QR code. A user uses the synthesized QR code to connect the broadcast receiver or a smart phone to a server, provides identification information to the server, and receives a compensation point. FIG. 1 is a view illustrating a concept according to an embodiment of the present invention.

Among 2-dimensional codes such as QR code, PDF417, and DataMatrix, MaxiCode, QR code is now described that is used most broadly.

QR code is a matrix-type 2D code that represents information by black-and-white lattice patterns. This code has been developed and distributed in 1994 by a Japanese company, Denso Wave, which declared not to claim patent rights. Compared to the existing barcode, QR code has many advantages, such as fast decoding, high capacity, large recording quantity, high density, error correction, 360-degree recognition, and connection function.

In particular, QR code can contain a great quantity of data and process numerals, letters, Korean characters, marks, binary codes, or control codes. For the numerals, the maximum of 7,089 characters (in case of English numerals, maximally 4,296 characters) can be represented by a single QR code.

Furthermore, even when partially deteriorated or damaged, QR code may restore itself with its own error correcting function that has four levels. Erroneous code, in the unit of a code word, can be restored by about 7% to about 30%.

Figure 2:
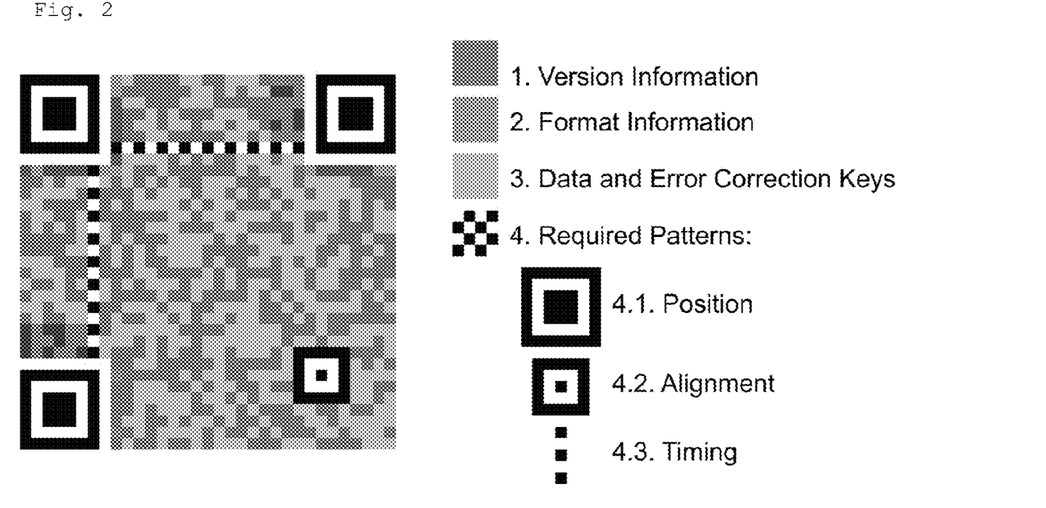
FIG. 2 schematically illustrates a structure of the QR code.

FIG. 2 schematically illustrates a structure of a QR code, which includes necessary patterns, such as position patterns, an alignment pattern, and timing patterns and which has version information and format information at a predetermined position in the data region.

According to an embodiment, using the error correcting function of QR code the image of the QR code is split and the split QR code image is transmitted with being distributed evenly over the entire airtime of the broadcast program. Not only when the entire broadcast program has been viewed but also when the broadcast signal is dropped or accompanied with noises on the way to cause some erroneous data, but the broadcast program has been viewed by a minimum reference or more, e.g., by 80% or more, the QR code data split and transmitted may be restored to compensate a faithful viewer.

Split and transmitted over the broadcast program, the QR code has a data region that contains identification information for the broadcast program and link information associated with a link through the QR code, e.g., URL (Uniform Resource Locator) information. Further, the data region may also include a start time of the broadcast program and channel information. In the event that different URLS are assigned to different broadcast programs, respectively, the QR code may exclude the broadcast program identification information, with only the URL information included therein.

Figure 3:
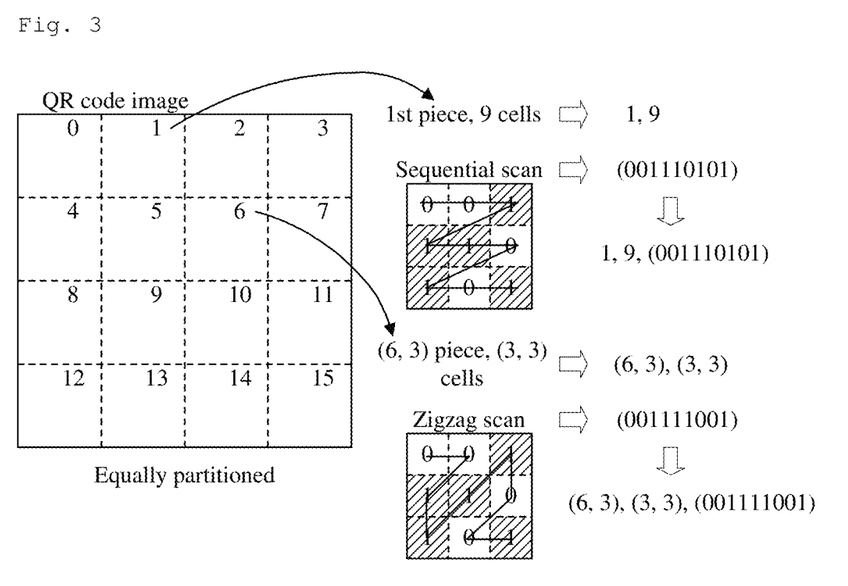
FIG. 3 illustrates evenly splitting a QR code image inserted into a broadcast signal and transmitted into pieces having the same size according to an embodiment of the present invention.

Generated to include such information, the QR code image is split into a number of pieces, so that the split pieces can be distributed and transmitted over the broadcast signal. As shown in FIG. 3, the QR code image may be evenly split into pieces having the same size, with numbers sequentially assigned to the pieces for identification. Bitmap data (0 or 1) in each piece are scanned along a predetermined direction—e.g., sequential scanning or zig-zag scanning—so that a bit stream can be generated for the bitmap data of each piece.

For example, each piece may include a piece number as its identifier or positional information in the QR code image and a bit stream of its bitmap data as its data. Instead of the piece number, a coordinate where a first cell of the piece is positioned in the entire QR code may be used as its identifier or positional information—for example, when the QR code has 81×81 cells, each piece takes up 3×3 cells, and the piece is the third one of the pieces along the horizontal direction and the fourth one along the vertical direction, (3, 4) or (6, 9)=(3×(3−1), 3×(4−1))) may be used.

In the example illustrated in FIG. 3, data for the second piece (1st piece) contains 1 which is the number for the second piece and 9 which is the number of cells included in the second piece, and bitmap data is sequentially scanned so that a bit stream of 001110101 is recorded. Data recording on data for the seventh piece is performed in a different way from that of the second piece. For example, (6, 3) which is the coordinate of the seventh piece and (3, 3) which respectively refer to the numbers of the cells in the seventh piece along the horizontal and vertical direction are recorded, and the bitmap data is scanned in a zig-zag manner so that a bit stream of 001111001 is recorded.

The QR code image may be split into several pieces having the same or different number of cells along the horizontal and vertical directions, or depending on the number of the cells in the QR code image, the last pieces along the horizontal and vertical directions, respectively, may have a different number of cells along the horizontal and vertical directions from the other pieces. For example, even when a QR code image with 73×73 cells is evenly split into pieces each having 5×5 cells, some pieces having a size of 4×5, 5×3, or 3×3 cells may be generated as well.

Figure 4:
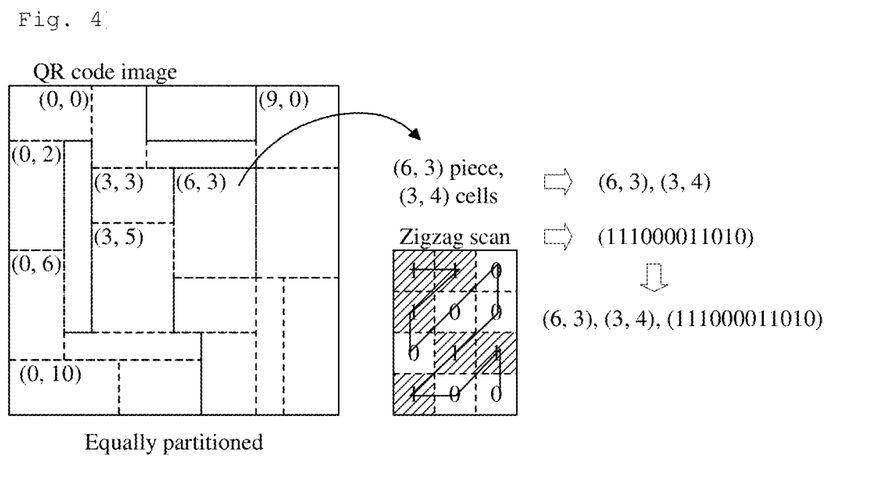
FIG. 4 illustrates evenly splitting a QR code image inserted into a broadcast signal and transmitted into pieces having different sizes according to an embodiment of the present invention.

According to an embodiment, the QR code image may be unevenly split into several pieces as shown in FIG. 4 so that at least one piece has a different size from those of the others. Further, each piece may have different sizes between cells along the horizontal direction and cells along the vertical direction. In such case, data for each piece may include positional information for the piece (e.g., coordinate of the piece), number of cells of bitmap of the piece (or numbers of cells along the horizontal and vertical directions), and a bit stream for the bitmap data of the piece. In FIG. 4, a piece whose start position is (6, 3) has a coordinate of (6, 3) and a cell size of (3, 4) and its bitmap data is subjected to zig-zag scanning, so that a bit stream 111000011010 is obtained as data for the piece.

The QR code image may be split in any way or may be split in such a way that a portion including important information is split into one or two pieces. As can be seen in FIG. 2, according to the structure of the QR code, the QR code image is divided into regions, such as a position detecting pattern (including a separator), a timing pattern, an alignment pattern, format information, version information, and a data region (including an error correcting code region). The QR code image may be split so that one piece includes the necessary regions, such as the position detecting pattern, timing pattern, and alignment pattern, and one or more pieces include the version information and format information.

When the split pieces are distributed and transmitted over the broadcast signal, information associated with the splitting of the QR code image needs to be generated as well so that the broadcast receiver can properly synthesize the QR code image from the piece data. The splitting information of the QR code image may include the number of the QR code image cells and the number of the split pieces (or the numbers of cells in each piece along the horizontal and vertical directions) or may further include information indicating how to scan the bitmap data in each piece, such as sequential scan or zig-zag scan.

Figure 5:
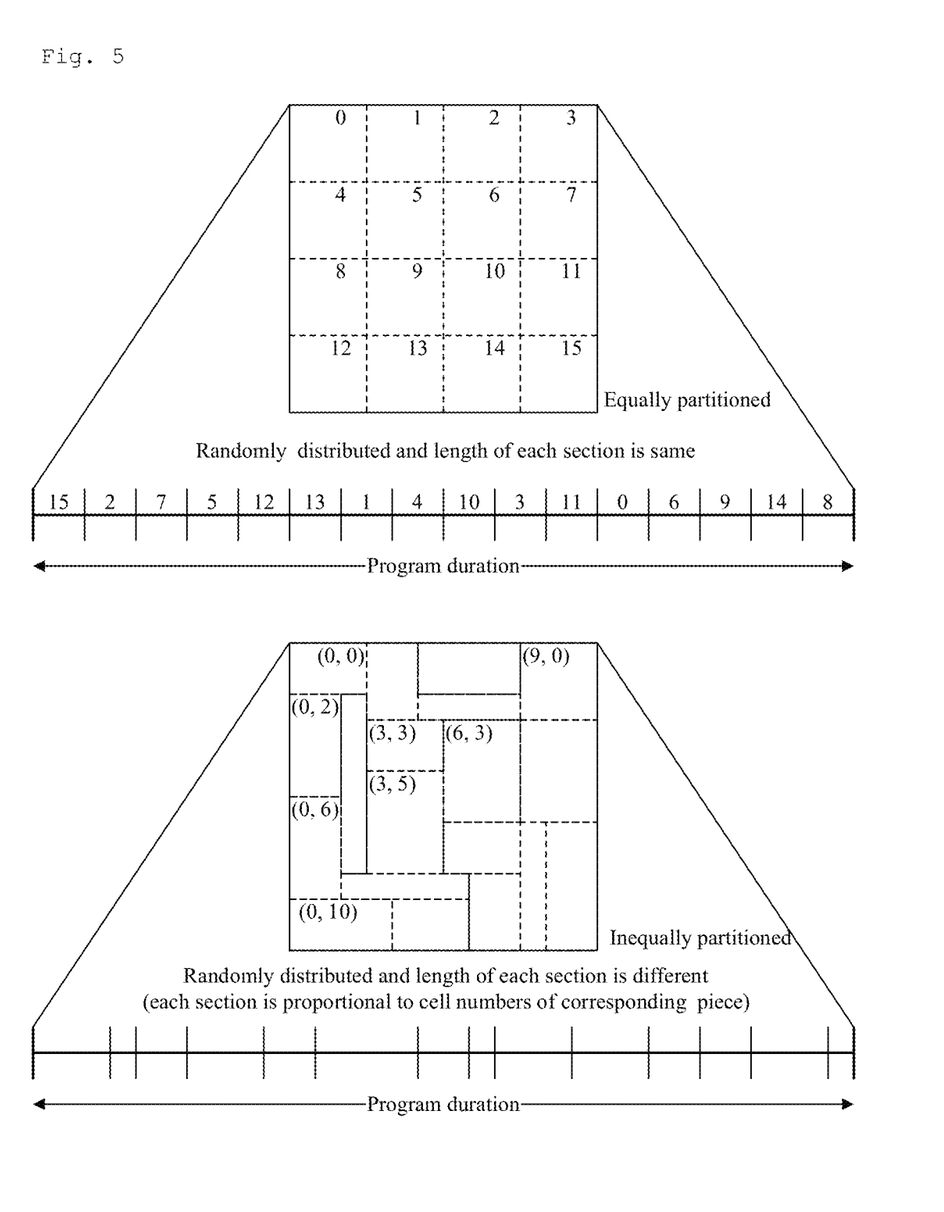
FIG. 5 illustrates data for each of pieces constituting the QR code image, which is randomly distributed over the playing time according to an embodiment, wherein the length of the section where each piece is to be included is constant or varies depending on the size of the piece.

The splitting information generated when the QR code image is split and the data of the pieces are distributed and transmitted over the broadcast signal from beginning of the broadcast program to its end. The splitting information and the piece data may be transmitted, inserted into a particular event stream of the broadcast program or into a predetermined reserved region of the packet. As shown in FIG. 5, data of each piece are evenly distributed over the airtime of the broadcast program (that is, in such a manner that the section where data of one piece is to be inserted is identical in length to the section where data of another piece is to be inserted) or the section where data of each piece is inserted may vary in proportion to the cell size of each piece. Irrespective of the arrangement order of the pieces, data of each piece may be randomly distributed over the broadcast program. The data of each piece may be repeatedly inserted in a section.

The splitting information for the QR code image may be advantageously inserted into the first section of the broadcast program, and may be inserted into two or more sections so that even when the first section is missed and there is an error, the split pieces can be synthesized into the QR code image. Alternatively, the splitting information may be repeatedly inserted into each section.

Further, at least one or more of main information necessary for the QR code image or part including the main information, for example, the position detecting pattern, timing pattern, alignment pattern, format information, and version information, may be inserted into one or more sections or may be repeatedly inserted in each section.

The broadcast receiver decodes a broadcast program selected by a tuner while detecting and temporarily storing data for the pieces constituting the QR code image included in the stream, and when the broadcast program is terminated or the data for the QR code image is gathered by a predetermined amount, synthesizes and decodes the QR code image. The broadcast receiver then connects to a server associated with the broadcast program to receive a compensation for watching or displays the synthesized QR code image to users, so that they can use the synthesized QR code image.

Figure 6:
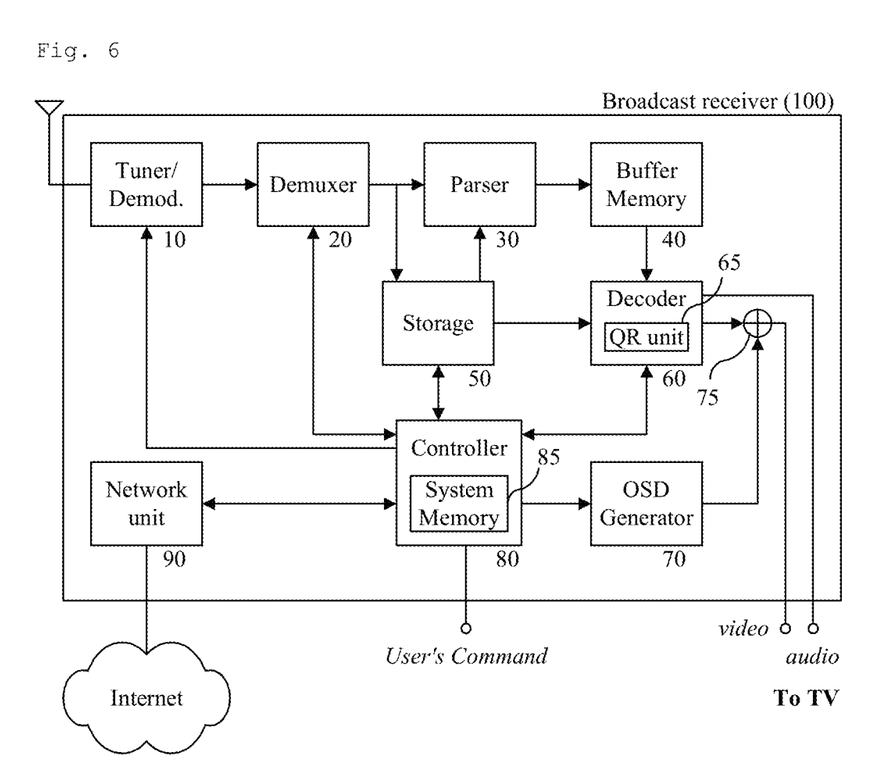
FIG. 6 illustrates a configuration of a broadcast receiver where the invention applies.

FIG. 6 is a block diagram illustrating a configuration of a broadcast receiver to which a method is applied which processes 2D code information distributed and transmitted over a broadcast signal. The broadcast receiver may be a set-top box or TV for receiving terrestrial broadcast, satellite broadcast, cable broadcast, and IP broadcast.

Referring to FIG. 6, the broadcast receiver 100 includes a tuner/demodulator 10 (hereinafter, simply referred to as "tuner"), a demuxer (or de-multiplexer) 20, a parser 30, a buffer memory 40, a storage 50, a decoder 60, a QR unit 65, an OSD generator 70, a mixer 75, a controller 80, a system memory 85, and a network unit 90. The tuner 10, the demuxer 20, and the parser 30 may be grouped into a broadcast receiving unit. Although the QR unit 65 is included in the decoder 60, the QR unit 65 may be included in the controller 80 or may be implemented in hardware or software.

The tuner 10 tunes a broadcast signal (e.g., terrestrial, cable, or satellite broadcast signal) received through an RF signal line connected to the tuner 10, such as a coaxial cable, to a signal bandwidth selected by a user and demodulates through the tuned bandwidth a received digital signal modulated in a manner such as QPSK (Quadrature Phase Shift Keying), QAM (Quadrature Amplitude Modulation), VSB (Vestigial Side Band) or OFDM (Orthogonal Frequency Division Multiplexing), thereby outputting a digital stream.

The demuxer 20 selects a transport stream carrying a video, an audio, text data, and management information (e.g., PSI) belonging to a single program selected among transport streams (MPTS: Multi-Program TS) of the multiplexed program in the digital stream and outputs the selected transport stream. The demuxer 20 selects the transport stream corresponding to one program from the digital stream based on information, such as a transport packet, e.g., PID, identified from program specific information (PSI, such as PAT or PMT) obtained by a tuning channel before the selection of the transport stream.

The digital stream selected and output by the demuxer 20, in the case of a specific mode, e.g., time-shift mode or recording mode, is stored in the storage 50. In particular, in the case of the time-shift mode, the stored digital stream is read out in a FIFO (First-In First-Out) manner and applied to the parser 30.

The parser 30 removes headers from transport packets of each transport stream applied from the demuxer 20 or read from the storage 50 under control of the controller 80 to gather only payload data, separates the payload into video and audio data according to the type, and outputs the separated data in the buffer memory 40 in the form of PES (Packetized Elementary Stream) packets.

The buffer memory 40 refers to header information of the PES packets output from the parser 30 to divide them according to the type (for example, video, audio, subtitle, or text data) and temporarily stores the divided data.

The storage 50 includes a hard disk or an SSD (Solid State Disk), which stores a high capacity of data. The storage 50 stores the stream output from the demuxer 20 or directly stores the scrambled transport stream output from the tuner 10 or stores contents received from an external server connected through a network or through an interface such as an USB or IEEE1394 under control of the controller 80.

The decoder 60 applies the PES packets, which have been stored in a separated manner in the buffer memory 40 according to the type, to its inner decoding module and decodes them to restore them into the original A/V (audio/video) signal. The content file stored in the storage 50 is split into small units and buffered in the buffer memory 40, and the decoder 60 decodes data fed from the buffer memory 40 and plays the content.

The QR unit 65 detects split data of the QR code image inserted into a predetermined packet among the packets supplied from the buffer memory 40, temporarily stores the split data, and when the play of the broadcast program is terminated (termination of the decoding of the last packet), gathers the split data to synthesize the QR code image. The QR unit 65 also stores the synthesized QR code image in its inner memory or the system memory 85 as an image file, displays the QR code image to overlap or be parallel with a broadcast program screen image output through the decoder 60 so that a user may use it, or decodes the synthesized QR code image and attempts to make a connection to a server corresponding to the URL included in the QR code through the network unit 90 under control of the controller 80.

The controller 80 enables a broadcast signal or a content-reproduced signal to be output on a TV screen depending on a preset condition and/or a user's request. The controller 80 may include the system memory 85 that provides a space to store data necessary for the control operation, environment settings, or process in execution and an operating system (not shown) that executes command codes such as firmware to drive hardware resources of the broadcast receiver 100 and to properly signals and/or information with the resources.

When the broadcast signal received through the tuner 10 and decoded by the decoder 60 includes data for the QR code image, the controller 80 controls the OSD generator 70 to generate a message notifying that when the broadcast program is viewed to the end, a compensation such as a coupon would be provided, for example, so that when a predetermined number of coupons are gathered, a content provided from its corresponding broadcasting station can be used, and periodically or intermittently displays the message on a portion of the screen while the broadcast program is on.

Further, the controller 80 controls the OSD generator 70 to generate a message notifying that the QR code image extracted from the broadcast signal is to be displayed around the time the broadcast program is terminated, a message notifying that the QR code image is synthesized and stored in the broadcast receiver 100, or a message notifying that the QR code image extracted from the broadcast signal and synthesized is used to automatically make a connection with the server of the broadcasting station to provide a coupon, and enables the mixer 75 to overlap the generated messages with the image output from the decoder 60.

The operation of the controller 80 and an application executed by the controller 80 is based on the proper relaying operation of the operating system (for example, particular functions, such as input/output, communication with an external source, identifying the state of the hardware, or requesting a timer to perform the operation, which are provided by the components in FIG. 6 and the operating system), whose detailed description is not made.

The broadcast receiver 100 shown in FIG. 6 may be integrally implemented with a TV or may be implemented as a peripheral device of a personal or laptop computer. The controller 80 receives a user's request through a common user interface, for example, a keypad, a remote controller, or a touchpad, and if necessary, controls the OSD generator 70 to output an image signal guiding a response to the request. The output image signal is visually represented through an electronic device having a screen displaying function, such as a TV or monitor.

The configuration of the broadcast receiver 100 shown in FIG. 6 is merely an example to provide detailed description on the invention and may further include other functional components. However, although other components are further included in the broadcast receiver 100, a broadcast receiver that, as described below, implements the concept and subject matter of the invention directly or through execution of a separate application belongs to the scope of the invention unless excluded from the claims.

Figure 7:
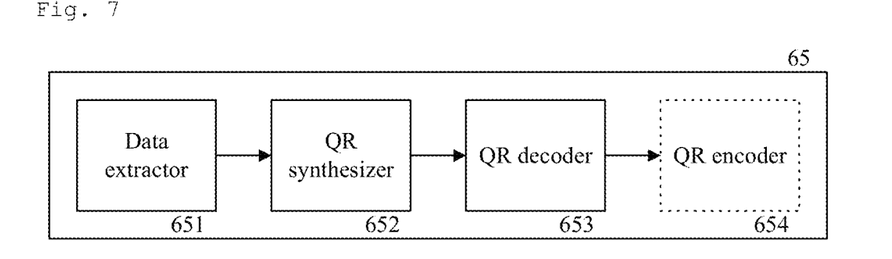
FIG. 7 illustrates a detailed configuration of the QR unit in the broadcast receiver of FIG. 6.

FIG. 7 is a block diagram illustrating a detailed configuration of the QR unit 65.

The QR unit 65 may include a data extractor 651, a QR synthesizer 652, and a QR decoder 653. The QR unit 65 may further include a QR encoder 654.

The data extractor 651 detects and extracts the QR code image split data inserted into a specific packet among packets decoded by the decoder 60 or a specific reserved region of the packet while the broadcast program is received through the tuner 10 and played or while contents stored in the storage 50 is in play, and temporarily stores the split data until the broadcast program is terminated. The extracted QR code image split data may be temporarily stored in the system memory 85.

The QR synthesizer 652 uses the QR code image split data to synthesize the QR code image when the play of the broadcast program is terminated or the QR code image split data is extracted by a predetermined reference (for example, 80% or more of the QR code image) and generates an image file for the synthesized QR code image.

The QR decoder 653 decodes the QR code image synthesized by the QR synthesizer 652 and obtains information recorded in a QR code which is distributed and transmitted through the broadcast program. As described above, the QR decoder 653 may obtain the identifier information for the broadcast program and/or information on a URL through which a connection is made from the QR code.

The URL information and/or broadcast program identifier information, included in the QR code and obtained from the broadcast signal, are used to make a connection with a server associated with the broadcast program so that a predetermined compensation (e.g., a coupon) is provided. An embodiment of this operation will be described below with reference to FIG. 8.

Figure 8:
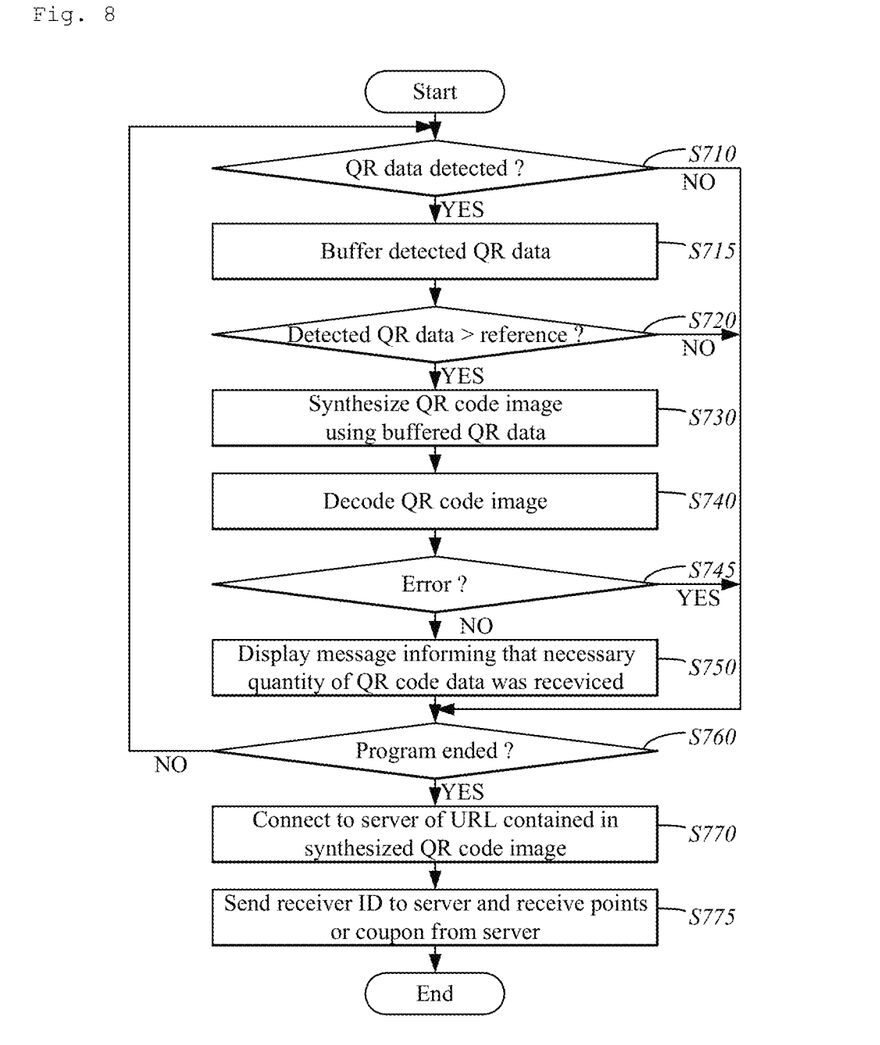
FIG. 8 is a flowchart illustrating a method of receiving a compensation by accessing a server associated with a broadcast program using URL information included in a QR code obtained from a broadcast signal.

The data extractor 651 identifies whether the QR code image split data is detected from the packet decoded by the decoder 60 (S710). From a specific packet or a specific reserved region of the packet is extracted the QR code image split data that includes split information for the QR code and data for each piece, and the extracted data is temporarily stored (buffered) (S710). Steps S710 and S715 may be repeatedly performed until the play of the broadcast program is terminated.

The data of respective pieces is distributed and provided over all the sections of the broadcast program, and QR code splitting information is provided during a start section of the broadcast program or may be inserted into other sections. The main information necessary for the QR code image or piece including the main information may be repeatedly inserted into one or more sections, and thus, if the splitting information is extracted twice or more or data for pieces having the same number or coordinate is extracted two or more times, the data extractor 651 makes a comparison therebetween, and if they are the same, stores only one of them or if they are different, stores all, but makes another comparison with re-extracted one, thereby storing only one identical thereto, deleting the other.

Since the QR code image splitting data may be repeatedly inserted in any section of the broadcast program one or more times, the data extractor 651 may store only one for the same data having the same value.

The QR synthesizer 652 identifies the number of cells (size) of the QR code from the QR code splitting information extracted by the data extractor 651, calculates the area of the QR code image to be synthesized from data for each piece temporarily stored, compares the calculated area with the number of cells of the QR code, and identifies whether, e.g., 80% or more of the cells are received (S720). When the QR code image is evenly split, the QR synthesizer 652 identifies the number of pieces of the QR code image from the QR code splitting information and compares the identified piece count with the number of the pieces temporarily stored and identifies whether a predetermined number or more of the split image data of the QR code image are extracted by a predetermined reference or more.

Extracting data for the pieces reaching 80% or more of the cell count of the QR code image to be received (yes in step S720), the QR synthesizer 652 uses the data for each extracted piece to synthesize the QR code image (S730). The QR synthesizer 652 identifies a position where the piece is to be placed from the piece number or coordinate information and arrays bit stream data according to a scanning method included in the splitting information to fill bitmaps in the region where the piece is to be positioned, thereby creating the entire QR code image.

The QR decoder 653 decodes the QR code image synthesized by the QR synthesizer 652 (S740), identifies whether there is an error in decoding (S745), and if there is no error (no in step S745), generates under control of the controller 80 a message notifying that the QR code for the broadcast program is received by a predetermined reference, e.g., 80%, or more through the OSD generator 70—which may further include a message notifying that a compensation may be provided by the QR code after the termination of the broadcast program based on what has been viewed (S750).

When it is determined in step S745 that no error occurs, steps S730 and S740 can be performed only one more time since the play of the broadcast program is terminated. Or, the synthesis and decoding of the QR code may be performed only after the broadcast program is terminated.

If the decoding of the broadcast program is terminated (S760), the controller 80 controls the network unit 90 to makes a connection with to a server which corresponds to a URL included in the QR code image synthesized by the QR synthesizer 652 and decoded by the QR decoder 653 (S770), transmits the program identifier included in the QR code and the identifier for the broadcast receiver 100 (or identifier of a user of the broadcast receiver 100) so that a compensation is provided (S775), such as a coupon or point, which is then stored in the system memory 85 or accumulated by the server for the broadcast receiver 100 (or a user). When a different URL as included in the QR image is as signed to each broadcast program, the controller 80 may transmit only the identifier of the broadcast receiver 100 (or identifier of a user of the broadcast receiver 100) to the server.

Or, when the broadcast program is terminated (yes in step S760), the controller 80 stores the synthesized QR code image in the system memory 85 and controls the OSD generator 70 so that whenever the channel for the broadcast program is selected, the number of stored QR codes is displayed on part of the screen, and when a predetermined number of QR codes are gathered, the controller 80 controls the network unit 90 so that a predetermined compensation may be provided.

Further, when the broadcast program is terminated (yes in step S760), the controller 80 may display the synthesized QR code image on part of the screen during a predetermined time or more so that a user may capture the QR code image by his smartphone or so and may make use of the QR code image.

The controller 80 uses the synthesized QR code image to make a connection with the server or deletes the stored QR code image after the QR code image is displayed on the screen so as to prevent double compensation from occurring.

Upon connection with the server corresponding to the URL included in the QR code image decoded by the QR decoder 653, the controller 80 may transmit the QR code image synthesized by the QR synthesizer 652 to the sever so that a viewer's watching pattern may be identified that includes, e.g., which section is not watched by a viewer based on an empty region that may be provided in a piece corresponding to the non-viewed section in the QR code image extracted and synthesized from the broadcast signal.

Further, when connecting to the server corresponding to the URL included in the QR code image, the controller 80 may transmit to the server the watching start time and end time of the broadcast program or the watching start time (or watching end time) and playing duration, which allow the server to identify a viewer's watching pattern including, e.g., whether the viewer watches the broadcast program in real time or first records it and watches later, and whether when watching the recorded broadcast program, the viewer watches it at normal speed or faster speed.

When connecting to the server corresponding to the URL included in the QR code image, the controller 80 need not transmit the watching start time and end time of the broadcast program after the broadcast program aired in real time is terminated but transmit the watching start time and end time of the broadcast program or the watching start time (or end time) and playing duration of the broadcast program only when the broadcast program stored in the storage 50 is played.

When the QR code image extracted from the broadcast signal and synthesized is displayed on the screen so that a viewer may capture the QR code image, the QR code image may be copied and utilized by a person who does not watch the broadcast program in an unjustified manner.

To address such problems, the broadcast receiver needs to connect directly to the server corresponding to the URL obtained by decoding the QR code image without exposing the synthesized QR code image. However, a broadcast receiver without networking functions may not perform a networking function and even a broadcast receiver with networking functions may not enable a user to be compensated for watching the broadcast program through his smartphone.

Accordingly, according to an embodiment, the QR code image extracted from the broadcast signal and synthesized, without being exposed to the screen, may be used to generate a new QR code that is then displayed on the screen and used by a user.

Referring to FIG. 7, the QR unit 65 includes the QR encoder 654 that may generate a new QR code using information (URL and/or broadcast program identifiers) obtained by the QR decoder 653 interpreting the QR code image. The newly generated QR code may include a URL, a broadcast program identifier and a broadcast receiver identifier (or user identifiers) to specify the broadcast receiver that has played the broadcast program or the user who has watched the broadcast program, or may further include a watching start time and/or end time of the broadcast program. The broadcast program identifier may be omitted as described above. When the broadcast receiver identifier (or user identifier) is exposed through the newly generated QR code, a QR code including an identifier for another broadcast receiver may be regenerated and wrongfully used.

Accordingly, when a QR code is newly generated, at least the identifier of the broadcast receiver needs to be encrypted to be known only to the server receiving it. The QR encoder 654 encrypts the identifier of the broadcast receiver using a predetermined encrypting method or encrypting key or according to a method designated by information included in or associated with the QR code image included in the broadcast signal and transmitted.

Further, upon encrypting the identifier of the broadcast receiver, the QR encoder 654 may use, as a seed necessary for encrypting, at least one, e.g., watching end time, of information to be recorded in the newly generated QR code or may use, as the seed necessary for encrypting, the number of pieces or the number of cells in the QR code image included in the splitting information for the QR code image transmitted over the broadcast signal. Since the QR code image transmitted through the broadcast signal is not exposed to the outside, it may be advantageous to use one or more of slitting information for the QR code image. In the splitting information of the QR code image, information may be further included that designates an encrypting seed and/or encrypting method to be used when the identifier of the broadcast receiver is encrypted.

The QR encoder 654 may represent information to be included in the new QR code other than URL in the form of a parameter of the URL. For example, when the URL is 'http://www.imbc.com/iamsinger', the URL may be represented as 'http://www imbccom/iamsinger#123abc890=111002180000~19452 5', wherein "123abc890" refers to the encoded broadcast receiver identifier, and "111002180000~194525" refers to watching start and end times.

When the play of the broadcast program is terminated or expected to be terminated, the QR synthesizer 652 uses data extracted and stored by the data extractor 651 to synthesize the QR code image, and the QR decoder 653 decodes the synthesized QR code image to obtain the broadcast program identifier and/or URL included in the QR code. The QR encoder 654 encrypts the identifier of the broadcast receiver (or identifier of the user) by a predetermined method and newly generates a QR code including at least the encrypted broadcast receiver identifier, URL, and the broadcast program identifier. The controller 80 controls the OSD generator 70 and the mixer 75 so that the newly generated QR code by the QR encoder 654 is displayed on part of the entire screen during a predetermined time.

A viewer may capture the QR code displayed on the screen after the broadcast program is terminated using a QR application installed in his smartphone and connects to the server according to URL information included in the QR code to receive a compensation, such as a coupon or point.

Thus, it can be possible to prevent the QR code inserted into the broadcast signal and synthesized from being illegally copied or utilized and to allow a user to use the QR code in a convenient way.

Although the above description has focused on the program provided through terrestrial, satellite, cable, or IP broadcast, the embodiments of the present invention are not limited thereto. For example, the embodiments of the present invention may also apply to contents separately provided through a VOD (Video On Demand) service or content receivers or player that provide VOD services (or OTT (Over The Top) services).

A content receiver, which provides VOD or OTT services, includes an IP function that allows content data to be downloaded from the server but may not include a broadcast receiving unit, such as a tuner or de-multiplexer for receiving terrestrial, satellite, or cable broadcast. Instead, the network unit 90 may receive content data from the content providing server in the form of streaming or downloading.

The embodiments of the present invention, which split a code including information and transmit the split code in a distributed manner over the content, may apply to 3D or multi-dimensional codes as well as 2D codes. Upon application to three or more dimensional codes—for example, when applying to 3D codes, a 3D code is split into a number of 2D codes, distributed and inserted into the content, and then transmitted. Receiving and detecting the split code, the content receiver synthesizes the split code into the 3D code.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of processing information by a content receiver, the method comprising:
    detecting multi-dimensional code data from a content provided through broadcast or an IP when the content is reproduced, the multi-dimensional code data being inserted into the content in a split manner;
    temporarily storing the detected multi-dimensional code data; and
    synthesizing the temporarily stored multi-dimensional code data into a multi-dimensional code,
    wherein the multi-dimensional code data includes splitting information for the multi-dimensional code and data for pieces included in an array of pieces and generated when the multi-dimensional code is split,
    wherein the splitting information includes size information of the multi-dimensional code and information on the number of the split pieces which are required for synthesizing an image of the multi-dimensional code from the data for the pieces,
    wherein the data for the pieces includes positional information indicating where a corresponding piece is placed in the multi-dimensional code and a bit stream for bitmap data of the corresponding piece, and
    wherein each piece takes up a plurality of cells less than cells of the multi-dimensional code, and each cell among the plurality of cells in each corresponding piece is included in an array of cells and represents one bit.

2. The method of claim 1, wherein synthesizing is performed after predetermined data constituting the multi-dimensional code is detected and stored by a predetermined reference or more or after the reproduction of the content is terminated.

3. The method of claim 1, wherein link information for connecting to a server is encoded in the multi-dimensional code.

4. The method of claim 3, wherein one or more of identification information indicating the content and transmission time of the content are further encoded in the multi-dimensional code.

5. The method of claim 3, further comprising:
    making a connection to a server corresponding to a URL obtained by decoding the synthesized multi-dimensional code when reproduction of the content is terminated; and
    transmitting an identifier of the receiver reproducing the content to the server.

6. The method of claim 1, wherein the splitting information further includes information indicating a method of scanning bitmap data in the piece, and wherein the splitting information is included in a first section and one or more sections of the content.

7. The method of claim 1, wherein the positional information is a coordinate of a point in a region occupied by the corresponding piece or a number assigned to the corresponding piece, and wherein the data for the piece further includes the number of cells of the bitmap of the corresponding piece.

8. The method of claim 1, wherein the content is split in sections of the number of the split pieces, and the data for the pieces is inserted in a section randomly selected among sections constituting the content and recorded once or more in the selected section.

9. The method of claim 8, wherein a length of the section where the data for the pieces is inserted varies in proportion to a size of the corresponding piece.

10. The method of claim 1, wherein a region including main information necessary for decoding the multi-dimensional code image is split into one or two pieces and repeatedly inserted into one or more of sections constituting the content.

11. The method of claim 1, further comprising:
    generating a new multi-dimensional code based on the multi-dimensional code; and
    displaying the new multi-dimensional code.

12. The method of claim 11, wherein the new multi-dimensional code includes a URL decoded from the multi-dimensional code and identification information of the receiver reproducing the content or user identification information.

13. The method of claim 12, wherein the identification information of the receiver or the user identification information is in an encrypted manner inserted into the new multi-dimensional code.

14. The method of claim 13, wherein the identification information of the receiver or the user identification information is encrypted based on one or more of multi-dimensional code data inserted in the content.

15. The method of claim 1, wherein the array of pieces is a 4×4 array of pieces and the array of cells in each corresponding piece is a 3×3 array of cells.

16. A content receiver comprising:
    a receiving unit configured to receive a content through broadcast or an IP;
    a playing unit configured to decode data output from the receiving unit;
    a multi-dimensional code processing unit configured to detect and temporarily store multi-dimensional code data inserted, in a split manner into the content from data decoded by the playing unit and synthesize the multi-dimensional code data into a multi-dimensional code; and
    a controller configured to control each element,
    wherein the multi-dimensional code data includes splitting information for the multi-dimensional code and data for pieces included in an array of pieces and generated when the multi-dimensional code is split,
    wherein the splitting information includes size information of the multi-dimensional code and information on the number of the split pieces which are required for synthesizing an image of the multi-dimensional code from the data for the pieces,
    wherein the data for the pieces includes positional information indicating where a corresponding piece is placed in the multi-dimensional code and a bit stream for bitmap data of the corresponding piece, and
    wherein each piece takes up a plurality of cells less than cells of the multi-dimensional code, and each cell among the plurality of cells in each corresponding piece is included in an array of cells and represents one bit.

17. The content receiver of claim 16, wherein the multi-dimensional code processing unit includes,
    a data detector configured to detect the multi-dimensional code data from the content;

a code synthesizer configured to synthesize the multi-dimensional code data into the multi-dimensional code; and a code decoder configured to decode the synthesized multi-dimensional code.

18. The content receiver of claim 17, wherein the multi-dimensional code processing unit further includes a code encoder for generating a new multi-dimensional code based on the multi-dimensional code.

* * * * *